Patented Apr. 20, 1943

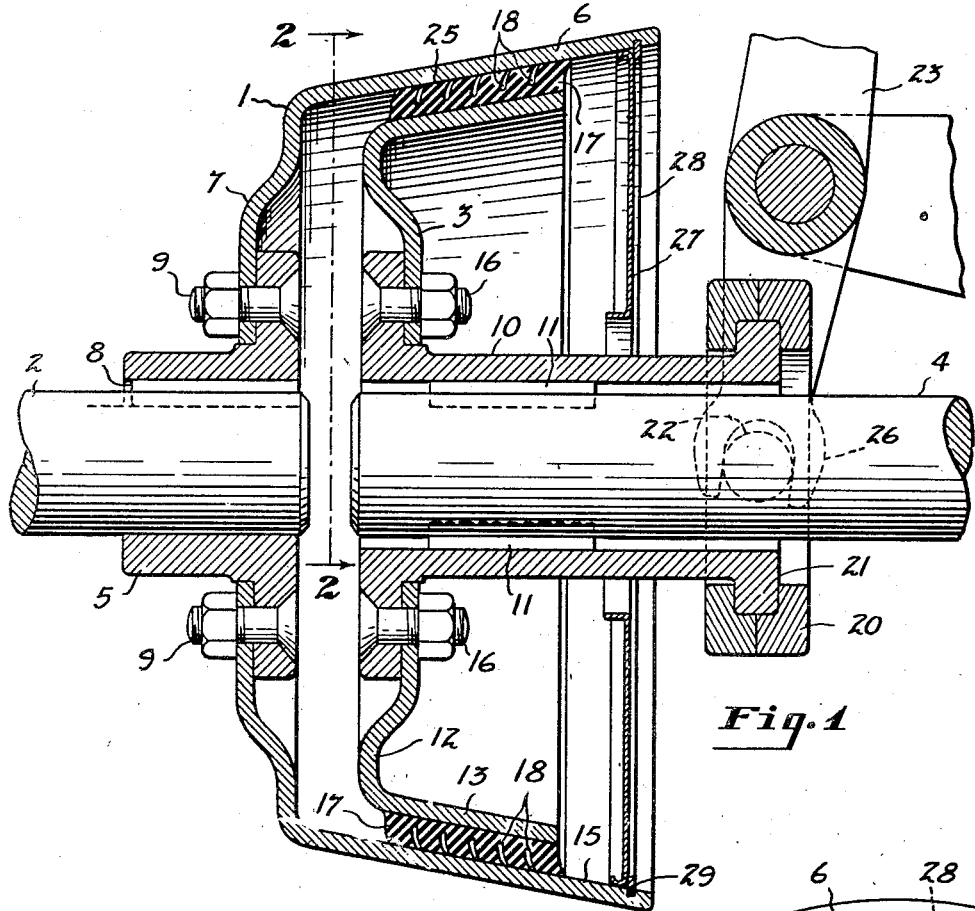
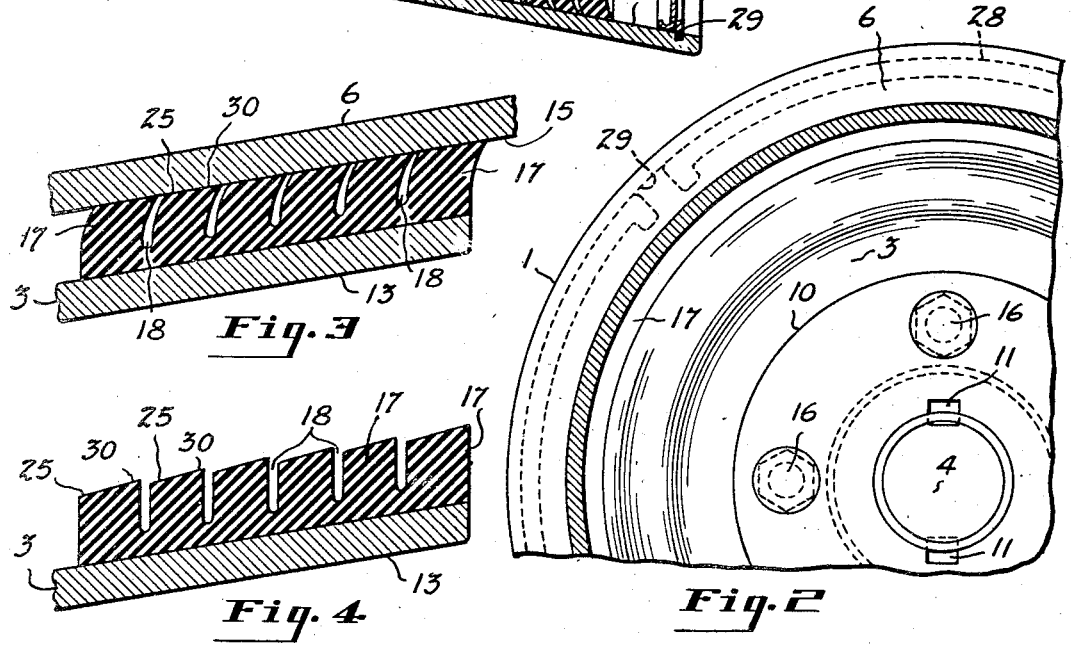

2,316,874

UNITED STATES PATENT OFFICE 2,316,874

CONE CLUTCH

Herman T. Kraft, Akron, Ohio, assignor to The General Tire & Rubber Company, Akron, Ohio, a corporation of Ohio Application October 9, 1940, Serial No. 360,415

12 Claims. (Cl. 192—66)

This invention relates to clutches and particularly to cone clutches which do not require a continued application of axial pressure to maintain engagement.

Cone clutches have the least number of parts and are therefore perhaps the most inexpensive clutches to manufacture. They have, however, been generally considered inferior to other clutches because of the high axial pressure which heretofore has been necessary in order to prevent slippage and wear between the driven and driving members. Because of this fact cone clutches have been replaced to a marked degree by clutches of the disc type, etc.

It is an object of the present invention to provide a relatively inexpensive cone clutch which does not require axial pressure in order to maintain engagement.

It is another object of the present invention to provide a self-locking cone clutch which will remain engaged or disengaged without the continued application of axial pressure.

It is a further object of the present invention to provide a self-locking cone clutch having long life which has sufficient flexibility to compensate for slight misalignment between the driven and driving shafts and which will remain in engaged or disengaged position without continued application of axial pressure.

Other objects will be apparent from the following description of the invention as illustrated by the drawing, in which:

Figure 1 is a vertical sectional view of a clutch mounted on suitable shafts and embodying the present invention;

Figure 2 is a sectional view of the line 2—2 of Figure 1;

Figure 3 is a sectional view through a portion of the clutch with the frictional elements in the engaged position and showing the manner in which the annular flexible ribs are deformed so as to lock the components of the clutch in engagement by means of their tendency to resume their molded diameter;

Figure 4 is a sectional view through the frictional elements of one of the clutch members showing the preferred shape of the annular flexible ribs in the unengaged position.

Referring more particularly to the drawing in which like parts are designated by like numerals of reference throughout the several views, it will be seen that the clutch comprises an outer member 1, which is adapted to be carried by a suitable rotatable shaft 2, preferably the driving shaft, an inner member 3 which is adapted to be rotatably carried on a second shaft 4 preferably the driven shaft, which shafts are in substantial alignment. The outer member 1 which is preferably the driving member, comprises a hub portion 5, which is bored to receive the shaft 2 and which may be keyed thereto by the key 8 so that it rotates with the shaft 2; a conical portion 6 with an inner conical engaging surface 15; and a web portion 7 which is connected to or preferably integral with the portion 6 and which is connected to the hub portion 5 by a suitable means such as the bolts 9.

The inner member which is preferably the driven member has a sleeve 10, which is adapted to slide axially on the shaft 4 and which is keyed to the shaft 4 by suitable means such as the key 11 so that it rotates therewith. The web portion 12 which preferably has a conical portion 13 of substantially the same slope as the inner engaging surface 15, is attached to the sleeve 10 by suitable means such as the bolts 16.

A plurality of annular flexible ribs 17 of rubberlike material, is disposed between the conical portions 6 and 13 of the outer and inner members respectively. The ribs 17 are preferably adhesively attached, for example, by rubber-to-metal adhesion to the outer surface of the conical portion 13 of the inner member and collectively form a frictional peripheral surface of generally frusto conical shape, the slope of which corresponds substantially to that of its cooperating engaging surface 15. The ribs 17 preferably have a height at least equal to their width but they should not be sufficiently high to buckle when they are compressed. The surface of the individual ribs is preferably frusto conical shape with a slope greater than that of the inner conical engaging surface 15. The ribs are usually produced from a highly reinforced rubber or synthetic rubber stock and are preferably spaced from each other by grooves 18 of sufficient width to permit substantial compressive deformation of the separate ribs.

Means such as the lever 23 and the collar 20 which is disposed about and in running fit with the annular bearing rib 21 of the sleeve 10 is provided for moving the inner members and outer members axially relative to each other so that the frictional surfaces 25 of the ribs 17 may be brought into engaging contact with or removed from the cooperating engaging surface 15 when desired. The collar 20 is provided with pins 22 which cooperate with the yoke 26 of the lever 23 and which prevent rotation of the collar 20.

A closure member 27 may be positioned near the end of the outer member having largest internal diameter so as to restrict the opening between said outer member and said sleeve 10 in order to reduce the tendency for accumulation of foreign matter during operation of the clutch. The closure member 27 may be held in place by the split retainer ring 28 which is adapted to lie in a suitable annular channel 29 within the outer member.

When the clutch is disengaged so that the engaging surface 15 and the frictional surfaces 25 are separated and the inner and outer members 3 and 1 respectively, are rotatable relative to each other, the flexible ribs 17 preferably lie in planes substantially perpendicular to the shafts 2 and 4.

When with the clutch in the disengaged position the inner member is moved toward the outer member, such as by moving the lever 23 so that the pressure on the pins 22 forces the sleeve 10 toward the shaft 2, the trailing edges 30 of the ribs 17 make first contact with the engaging surface 15 of the outer member. By continued movement of the lever 23 in the same direction and by the application of further axial force on sleeve 10, the ribs 17 and particularly the trailing edge portions 30 are first compressed and then as the base of the ribs is moved beyond their places of contact with the engaging surface 15, they are bent out of their initial plane so that the whole peripheral surfaces of the ribs bears against the cooperating conical surface 15. Since rubber-like material has relatively great compressive strength and tends to retain its molded diameter, the ribs 17, after they are compressed and bent to an acute angle with the axis of the shafts, as illustrated in Figures 1 and 3, exert a substantial force against the surface 15 in their attempt to retain their original height. A component of this force is in the direction of the shaft axis and holds the member 3 in engagement with the member 1. Because of this toggle-like action the inner and outer members tend to remain in their engagement and continued axial pressure need not therefore be exerted by the lever 23.

When it is desired to disengage the members 1 and 3 pressure in the opposite direction is applied through the lever 23 so as to move the members 1 and 3 axially away from each other. During the disengaging operation the ribs 17 are again first compressed and then allowed suddenly to expand as they are bended beyond the vertical plane. The effect of this toggle-like action is to decrease wear during the release of the clutch.

Since there is no tendency for the members 1 and 3 to move relative to each other, there is no need for axial pressure to be applied by the yoke 23 except at the moment of engagement or disengagement. Since the ribs 17 are relatively flexible the clutches of the present invention may be used to couple shafts which are slightly out of alignment and they are particularly desirable for use in heavy machinery such as boat drives, etc.

While I have shown the ribs 17 as being attached to or as making up the outer peripheral surface of the inner member 3 which is the most desirable arrangement, they of course can be attached to or make up the inner conical surface of the outer member without departing from the spirit of the present invention.

Furthermore, it is to be understood that the particular form of apparatus shown and described, and the particular procedure set forth, are presented for purposes of explanation and illustration and that various modifications of said apparatus and procedure can be made without departing from my invention as defined in the appended claims.

What I claim is:

1. A clutch comprising an outer member adapted to be carried by a rotatable shaft and adapted to rotate with said shaft, said outer member having an interior engaging surface of substantially frusto conical shape, an inner rotatable member carried by a second shaft substantially concentric with the engaging surface of said outer member, said inner member having a peripheral surface which is generally of conical shape, one of said conical surfaces having a plurality of deformable projections of wear resisting soft rubber-like material attached thereto which projections are adapted to bear against the other conical surface when the inner and outer members are pressed axially against each other, means for relatively moving said inner member and said outer member axially toward and away from one another and for exerting sufficient axial pressure to deform said projections to a more acute angle with respect to said shafts whereby the force exerted by said projections in an attempt to retain their molded height has a sufficiently large component in the direction of the shafts to retain the conical surfaces of the members in driving engagement without continued application of axial pressure by said moving means.

2. A clutch comprising an outer member adapted to be carried by rotatable shaft and adapted to rotate with said shaft, said outer member having a hub portion bored to receive a shaft and a conical portion carried by said hub portion, said conical portion having an interior engaging surface of substantially frusto conical shape, an inner rotatable member carried by a second shaft substantially concentric with the engaging surface of said outer member, said inner member having a peripheral surface which is generally conical shape with a slope corresponding to the engaging surface of the outer member, one of said conical surfaces having a plurality of deformable annular flexible ribs of wear resisting soft rubber-like material attached thereto to which ribs have greater height than width and are adapted to bear against the conical surface to which they are unattached when the inner and outer members are pressed axially against each other, means for moving said inner member and said outer member axially toward and away from each other and for exerting sufficient axial pressure to first compress and then deform said ribs to an acute angle with said shafts whereby the force exerted by the ribs in an attempt to retain their molded height has sufficiently large component in the direction of the shafts to retain the conical surfaces of the members in driving engagement without continued application of axial pressure by said moving means.

3. A clutch comprising an outer member adapted to be carried by a rotatable driving shaft and having a hub portion bored to receive the shaft and keyed thereto, a web portion attached to said hub portion and a conical portion with an inner engaging surface of substantially conical shape, an inner member substantially concentric within said outer member and having peripheral surface of substantially frusto conical shape which surface is adapted to be pressed into engaging contact with said conical inner surface, said inner member being keyed to rotate with a driven shaft that is substantially concentric with said outer member, one of said conical surfaces comprising a plurality of annular, flexible and deformable ribs having frusto conical surfaces of greater slope than the slope of the cooperating engaging surface and separated by grooves of sufficient width to permit substantial compressive deformation of said ribs, means for moving the inner member axially relative to said outer member and for exerting sufficient axial pressure to deform said ribs to an acute angle with said axis so that they may exert a holding force component parallel to the shafts, a closure member positioned near the end of said outer member having largest internal diameter and restricting the opening of said outer member, means comprising an expansible retaining ring for retaining said closure member adjacent the open end of said outer member, said inner member being substantially completely enclosed by said outer member and said closure ring member.

4. A clutch comprising an outer member adapted to be carried by rotatable shaft and adapted to rotate with said shaft, said outer member having a hub portion bored to receive a shaft, a web portion carried by said hub portion and a conical portion with an inner conical engaging surface carried by said web portion, an inner member having a sleeve which is adapted to slide axially but not rotatably on a second rotatable shaft which is substantially concentric with the engaging surface of said outer member, a frame portion carried by said sleeve said frame portion having a frusto conical peripheral surface which is adapted to be pressed into engaging contact with the conical inner surface of said outer member, said peripheral surface comprising a plurality of annular, flexible and deformable ribs of rubber-like material which ribs are adapted to bear against the inner conical surface of said outer member, the peripheral surface of each of said ribs being frusto conical shaped with a slope greater than said engaging surfaces of said outer member, means for moving the inner member relative to said outer member so that the ribs may be brought into engagement or disengagement with the inner surface of said outer member and may be deformed to an acute angle with said shaft so as to exert a component of force sufficient to retain the conical surfaces in driving engagement without the continued application of axial pressure by said moving means.

5. A clutch comprising an outer member adapted to be carried by a rotatable driving shaft and having a hub portion bored to receive the shaft and keyed thereto, a web portion attached to said hub portion and a conical portion with an inner engaging surface of substantially conical shape, an inner member substantially concentric within said outer member and having peripheral surface of substantially frusto conical shape which surface is adapted to be pressed into engaging contact with said conical inner surface, said inner member being keyed to rotate with a driven shaft that is substantially concentric with said outer member, one of said conical surfaces comprising a plurality of annular, flexible and deformable ribs having a height at least equal to their width and having frusto conical surfaces of greater slope than the slope of the cooperating engaging surface and separated by grooves of sufficient width to permit substantial compressive deformation of said ribs, means for moving the inner member axially relative to said outer member and for exerting sufficient axial pressure to deform said ribs to an acute angle with said axis so that they may exert a holding force component parallel to the shafts, a closure member positioned near the end of said outer member having largest internal diameter and restricting the opening of said outer member, means comprising an expansible retaining ring for retaining said closure member adjacent the open end of said outer member, said inner member being substantially completely enclosed by said outer member and said closure ring member.

6. A clutch comprising an outer member adapted to be carried by a rotatable driving shaft and having an inner engaging surface of substantially conical shape, an inner member substantially concentric within said outer member and having a peripheral surface of substantially frusto conical shape, which surface is adapted to be pressed into engaging contact with said conical inner surface, said inner member being keyed to rotate with a driven shaft that is substantially concentric with said outer member, one of said conical surfaces comprising a plurality of annular, flexible and deformable ribs, and means for moving the inner member axially relative to said outer member and for exerting sufficient axial pressure to deform said ribs to an acute angle with said axis so that they may exert a holding force component parallel to the shafts.

7. A clutch comprising an outer member adapted to be carried by a rotatable driving shaft and having an inner engaging surface of substantially conical shape, an inner member substantially concentric within said outer member and having a peripheral surface of substantially frusto conical shape, which surface is adapted to be pressed into engaging contact with said conical inner surface, said inner member being keyed to rotate with a driven shaft that is substantially concentric with said outer member, one of said conical surfaces comprising a plurality of annular, flexible and deformable ribs and separated by grooves of sufficient width to permit substantial compressive deformation of said ribs, and means for moving the inner member axially relative to said outer member and for exerting sufficient axial pressure to deform said ribs to an acute angle with said axis so that they may exert a holding force component parallel to the shafts.

8. A clutch comprising an outer member adapted to be carried by a rotatable driving shaft and having a hub portion bored to receive the shaft and keyed thereto, a web portion attached to said hub portion and a conical portion with an inner engaging surface of substantially conical shape, an inner member substantially concentric within said outer member and having a peripheral surface of substantially frusto conical shape, which surface is adapted to be pressed into engaging contact with said conical inner surface, said inner member being keyed to rotate with a driven shaft that is substantially concentric with said outer member, one of said conical surfaces comprising a plurality of annular, flexible and deformable ribs, and means for moving the inner member axially relative to said outer member and for exerting sufficient axial pressure to deform said ribs to an acute angle with said axis so that they may exert a holding force component parallel to the shafts.

9. A clutch comprising an outer member adapted to be carried by a rotatable driving shaft and having a hub portion bored to receive the shaft and keyed thereto, a web portion attached to said hub portion and a conical portion with an inner engaging surface of substantially conical shape, an inner member substantially concentric within said outer member and having a peripheral surface of substantially frusto conical shape, which surface is adapted to be pressed into engaging contact with said conical inner surface, said inner member being keyed to rotate with a driven shaft that is substantially concentric with said outer member, one of said conical surfaces comprising a plurality of annular, flexible and deformable ribs having frusto conical surfaces of greater slope than the slope of the cooperating engaging surface, means for moving the inner member axially relative to said outer member and for exerting sufficient axial pressure to deform said ribs to an acute angle with said axis so that they may exert a holding force component parallel to the shafts, and a closure member positioned near the end of said outer member having largest internal diameter and restricting the opening of said outer member, means for retaining said closure member adjacent the open end of said outer member, said inner member being substantially completely enclosed by said outer member and said closure ring.

10. A clutch comprising an outer member adapted to be carried by a rotatable driving shaft and having a hub portion bored to receive the shaft and keyed thereto, a web portion attached to said hub portion and a conical portion with an inner engaging surface of substantially conical shape, an inner member substantially concentric within said outer member and having a peripheral surface of substantially frusto conical shape, which surface is adapted to be pressed into engaging contact with said conical inner surface, said inner member being keyed to rotate with a driven shaft that is substantially concentric with said outer member, one of said conical surfaces comprising a plurality of annular, flexible and deformable ribs having a height at least equal to their width and having frusto conical surfaces of greater slope than the slope of the cooperating engaging surface and separated by grooves of sufficient width to permit substantial compressive deformation of said ribs, and means for moving the inner member axially relative to said outer member and for exerting sufficient axial pressure to deform said ribs to an acute angle with said axis so that they may exert a holding force component parallel to the shafts.

11. A clutch comprising a driving member and a driven member, one of said members having an internal conical surface, the other of said members being provided with a peripheral surface for engagement with said interior surface and movable axially relative thereto, said peripheral surface having a series of projections of resilient material of a greater unengaged diameter than engaged diameter, the resiliency of said resilient projections being sufficient to maintain the said driving and driven members in power transmitting engagement and being sufficiently deformable to permit disengagement of the clutch units when force is applied to pull one from the other in an axial direction.

12. A clutch adapted to retain engagement or disengagement without continued application of axial force, comprising an outer frusto-conical member carried by a rotatable driving shaft and adapted to rotate with said shaft, an inner rotatable member carried by a second shaft in substantial alignment with said driving shaft, said outer member having an interior engaging surface of generally frusto-conical shape, said inner member having a peripheral surface, also of generally frusto-conical shape, carrying a plurality of annular deformable ribs of wear-resistant, soft rubber-like material, the outer surface of said ribs being of generally frusto-conical shape and together forming an engaging surface substantially complemental to the interior surface of said outer member, the engaged diameter of the engaging surface of said inner member being less than the unengaged diameter, means for relatively moving said inner member and said outer member toward and away from one another and for exerting sufficient axial pressure to compress and deform said ribs to a more acute angle with respect to said shafts, whereby a component of the force exerted by said ribs to resist compression has a substantial axial component in the direction of said outer member and tends to retain said members in engagement.

HERMAN T. KRAFT